United States Patent
Harned et al.

[11] 3,787,094
[45] Jan. 22, 1974

[54] HYDRAULIC ANTI-LOCK BRAKE CONTROL SYSTEM

[75] Inventors: John L. Harned, Grosse Pointe Woods; Laird E. Johnston, Birmingham, both of Mich.

[73] Assignee: General Motors Corporation, Detroit, Mich.

[22] Filed: Sept. 30, 1971

[21] Appl. No.: 185,233

[52] U.S. Cl. ............... 303/10, 188/359, 303/21 F
[51] Int. Cl. ............................................ B60t 13/16
[58] Field of Search .... 303/10, 11, 21 F; 60/54.5 P; 188/359

[56] References Cited
UNITED STATES PATENTS
3,661,427   5/1972   Hodge ................................. 303/10
3,623,778   11/1971  Horvath ........................... 303/21 F
3,288,538   11/1966  DeMarcellus .................... 303/21 F Primary Examiner—George E. A. Halvosa
Attorney, Agent, or Firm—D. D. McGraw

[57] ABSTRACT

A brake control system includes a pressure operated wheel brake, a master cylinder, a positive displacement pump drivingly connected to the wheel, a brake actuator providing a brake pressure to the wheel brake in proportion to the pump generated pressure, an orifice exhausting the pump generated pressure at a rate which prevents the pump generated pressure from operating the actuator throughout the range of vehicle speeds, and a slip control valve in series connection with the orifice and providing a variable restriction to exhaustion of the pump generated pressure in proportion to the difference between the master cylinder and wheel brake pressures. The flow area presented by the variable restriction of the slip control valve decreases at a decreasing rate as the differential between master and wheel brake pressures increases.

1 Claim, 1 Drawing Figure

PATENTED JAN 22 1974 3,787,094
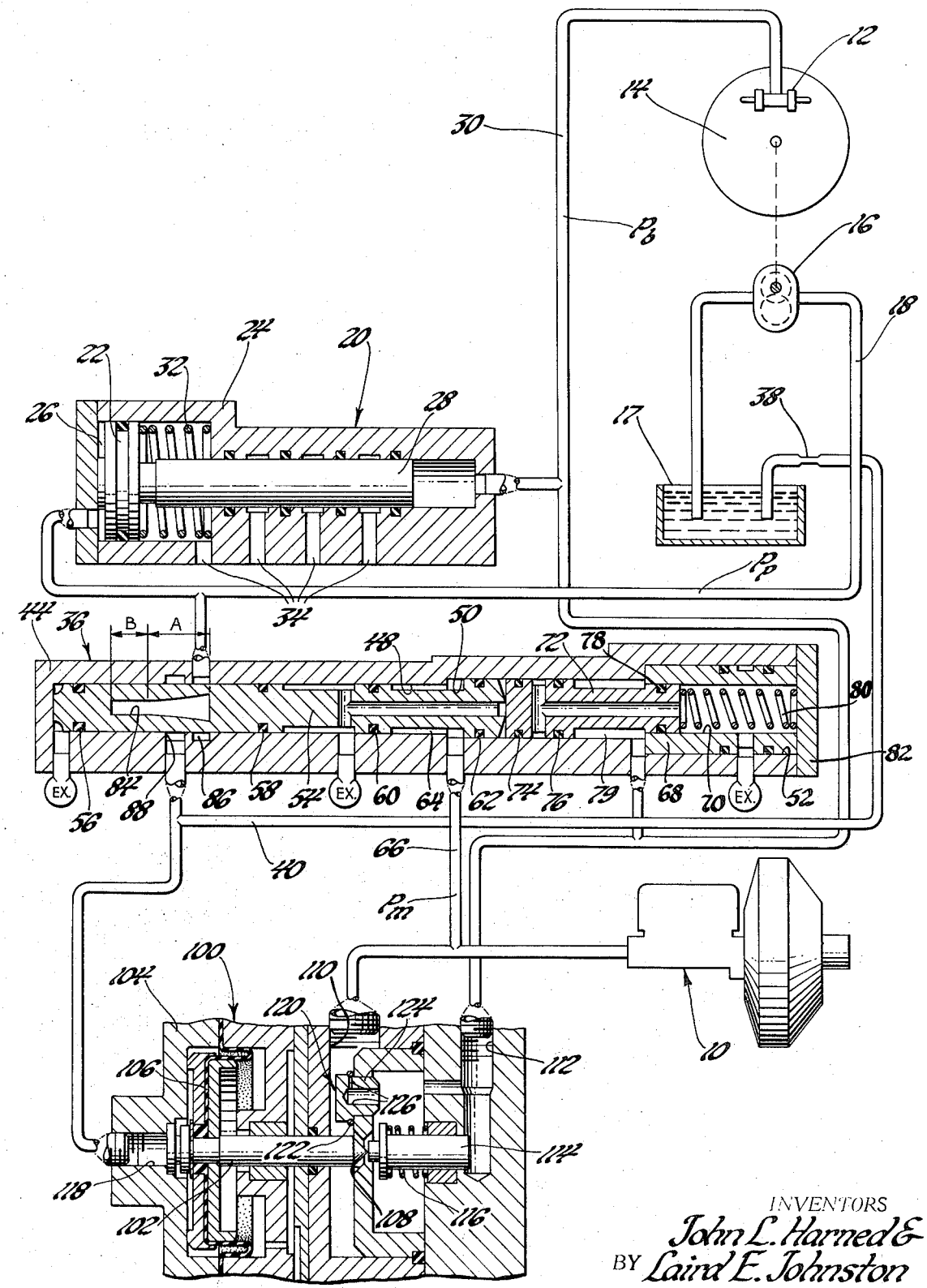
INVENTORS
John L. Harned &
BY Laird E. Johnston
D.D. McGraw
ATTORNEY

HYDRAULIC ANTI-LOCK BRAKE CONTROL SYSTEM

The invention relates to an anti-lock brake control system and more particularly to an all hydraulic wheel slip control system which permits the vehicle operator to control the level of wheel slip over a wide range of values without allowing complete wheel lock-up.

It is well known that the lateral friction coefficient between a vehicle tire and the road surface decreases rapidly when a braking torque generated by an excessive brake pedal actuation causes the vehicle wheel to depart from the free rolling condition and approach the locked wheel condition. This decrease in lateral friction coefficient as excessive braking causes an increase in wheel slip is commonly evidenced by impaired vehicle directional stability. It is, therefore, desirable to limit the decrease in lateral friction coefficient by controlling the brake pressure so as to maintain the wheel slip at some acceptable value.

The present invention allows the vehicle operator to control the magnitude of wheel slip over a wide range of values but prevents the wheels from locking up completely.

The present invention includes generally a fluid pressure operated wheel brake, an operator actuated master cylinder, a positive displacement pump driven by the wheel, an actuator providing a brake pressure proportional to the pump generated pressure, an orifice exhausting the pump generated pressure to the pump at a rate which prevents the actuator from pressurizing the brake throughout the range of pump speeds consistent with vehicle operation, and a slip control valve in series connection with the orifice and providing a variable restriction as a function of the difference between the master cylinder and wheel brake pressures. When operator actuation of the master cylinder results in a master cylinder pressure exceeding the wheel brake pressure, the slip control valve decreases the flow area exhausting the pump generated pressure to the sump giving rise to an increased pump generated pressure which acts through the actuator to increase the brake pressure and cause deceleration of the wheel. This increased brake pressure acts on the slip control valve urging an increase in the flow area of the restriction which will in turn decrease the brake pressure. The wheel can never reach the full lock-up condition inasmuch as the pump would stop generating pressure and the actuator would relieve the brake pressure permitting the wheel to accelerate. A low speed cutout valve communicates master cylinder pressure directly to the wheel brake at vehicle speeds below a predetermined level where the pump and slip control valve cannot consistently operate the brake.

The many objects, advantages and features of the present invention will become apparent upon consideration of the following specification and the accompanying drawing which depicts brake control system schematically.

Referring to the drawing, it can be seen that the brake system includes a conventional operator-actuated master cylinder 10 which generates a master cylinder pressure and a conventional fluid pressure actuated brake 12 which imparts a braking torque to the wheel 14 in proportion to the brake pressure acting thereon.

A positive displacement pump 16 is drivingly connected to the wheel 14 so as to provide in conduit 18 a pump generated pressure, hereinafter referred to as $P_p$.

A hydraulic actuator 20 serves as a hydraulic ram which generates a brake pressure, hereinafter referred to as $P_b$, in proportion to the $P_p$ communicated thereto. The hydraulic actuator 20 includes a piston 22 which is sealingly movable in housing 24 and forms therewith a chamber 26 to which conduit 18 communicates $P_p$. A piston rod 28 attached to piston 22 is sealingly movable in the housing 24 and forms a movable wall of $P_b$ conduit 30 which is connected to the wheel brake 12. A spring 32 is seated on housing 24 and urges the pistons to the rest position shown in the drawing. The ratio of $P_b$ to $P_p$ is determined by the ratio of end areas of piston rod 28 and piston 22. Exhaust ports 34 vent any leakage of hydraulic fluids.

A slip control valve 36, a conduit 40, and an orifice 38 are connected in series between $P_p$ conduit 18 and sump 17. Slip control valve 36 includes a housing 44 having stepped bores 48, 50, and 52 formed therein. A valve spool 54 is slidable in housing 44 and is sealed by seals 56, 58, and 60 with the walls or bore 48 and by seal 62 with the wall of bore 50. Valve spool 54 is necked down intermediate seals 60 and 62 to provide an annular space 64 which is connected to master cylinder 10 by conduit 66. It may be seen that master cylinder pressure, hereinafter referred to as $P_m$, communicated to annular space 64 acts on the differential area of spool 54 presented by the diametrical difference between bores 48 and 50 to provide a pressure force acting to move spool 54 rightwardly.

An annular sleeve 68 is sealingly received in bore 52 of housing 44 and provides a bore 70 of lesser diameter than bore 50. A piston 72 is slidable in housing 44 and sealed with the wall of bore 50 by seals 74 and 76, and with the walls of bore 70 by seal 78. Piston 72 is necked down intermediate seals 76 and 78 providing an annular space 79. The differential area of piston 72 presented by the difference between the diameters of bores 70 and 50 is acted upon by the $P_b$ communicated thereto by $P_b$ conduit 30 to provide a leftward acting pressure force on piston 72 causing it to engage the end of valve spool 54. A spring 80 is seated at the end closure cap 82 of housing 44 and urges piston 72 and valve spool 54 to their leftwardmost position wherein the left end of valve spool 54 engages housing 44. Thus, it may be seen that spring 80 defines the position of the valve spool 54 in housing 44 when the $P_m$ pressure force acting thereon does not exceed the combined $P_b$ pressure force and force of spring 80.

When spool 54 of slip control valve 36 is in the normal rest position as shown in the drawing, a slot 84 cut in valve spool 54 unrestrictedly communicates pump 16 generated flow received through conduit 18 at inlet annulus 86 of housing 44 to outlet annulus 88 of housing 44 which is connected to conduit 40. Thus, orifice 38 provides the only restriction of flow from $P_p$ conduit 18 to the sump 17.

Slot 84 is of variable width so that as spool 54 is moved rightwardly from the rest position, it provides a progressively decreasing flow area from inlet annulus 86 to outlet annulus 88. Preferably, the flow area of the slot 84 decreases exponentially along its portion designated "A" and then provides a constant minimum flow area along the portion of its length designated "B." The significance of providing such a variable flow restriction will be discussed hereinafter.

A low speed cutout valve 100 provides a direct fluid path between the master cylinder 10 and the wheel brake 12 at vehicle speeds below some predetermined level. The low speed cutout valve 100 includes a tapered plunger 102 which is slidable in housing 104 and attached to diaphragm 106. A valve seat 108 formed in housing 104 connects fluid passages 110 and 112 which are respectively connected to $P_m$ conduit 66 and $P_b$ conduit 30. A hydraulically balanced piston 114 is slidable in housing 104 and is biased by spring 116 into engagement with the tapered end of plunger 102. Spring 116 acts through piston 114 to hold plunger 102 unseated relative to valve seat 108 until the conduit 40 pressure communicated to diaphragm 106 by inlet port 118 exceeds the force of spring 116. Thus, as will be more fully described hereinafter, the low speed cutout valve 100 provides a $P_b$ equal to $P_m$ until the conduit 40 pressure reaches a predetermined threshold during wheel acceleration and then again provides a $P_b$ equal to $P_m$ during wheel deceleration. The low speed cutout valve 100 also includes a check valve 120 which consists of an O-ring 122 seated in a groove on a plug 124 situated in the wall of housing 104 between $P_m$ passage 110 and $P_b$ passage 112. A passageway 126 in plug 124 is closed by an O-ring 122 when $P_m$ exceeds $P_b$ and is open when a $P_b$ in excess of $P_m$ lifts the O-ring 122 from the plug 124. Thus, check valve 120 prevents $P_b$ from exceeding the level of braking being called for by $P_m$.

OPERATION

When the vehicle is stopped, wheel 14 is not rotating and pump 16 drivingly connected thereto is not being driven. $P_p$ in conduit 18 equals zero due to its communication to sump 17 through slot 84 of slip control valve 36, conduit 40, and orifice 38. Spring 32 of actuator 20 holds piston 22 in its rest position shown in the drawing so that piston rod 28 exerts no force on the hydraulic brake fluid within $P_b$ conduit 30. Spring 116 holds the tapered plunger 102 of low speed cutout valve 100 away from the valve seat 108 so that $P_b$ and $P_m$ both equal zero when the master cylinder 10 is not actuated.

As the vehicle is accelerated from rest, pump 16 is driven at a speed proportional to the wheel 14 pumping fluid from sump 17 to $P_p$ conduit 18. This flow in conduit 18 is communicated unrestrictedly through the fully open slot 84 of valve spool 54 to conduit 40 and is then communicated restrictedly through orifice 38 to the sump 17, giving rise to a pressure $P_p$ in conduit 18. As the speed of wheel 14 and pump 16 increases with the vehicle speed, $P_p$ increases to a point where the speed reference pressure in conduit 40 acting on diaphragm 106 of low speed cutout valve 100 exceeds the force of spring 116 thus closing the low speed cutout valve 100. Spring 32 of the actuator 20, orifice 38, and pump 16 are sized relative one another to prevent movement of actuator piston 22 by the $P_p$ pressure force throughout the range of operating speeds of the vehicle.

During master cylinder actuation at wheel speeds below the threshold of low speed cutout valve 100, the master cylinder generated pressure $P_m$ is communicated through the low speed cutout valve 100 directly to wheel brake 12. At wheel speeds above the threshold of low speed cutout valve 100, pump 16 provides hydraulic power for actuation of the brake 12 through actuator 20 with the slip control valve 36 functioning to control the magnitude of $P_p$ acting on the actuator 20.

The position of valve spool 54 within housing 44 and consequently the flow area presented by slot 84 is determined by the difference between $P_m$ and $P_b$ and the force of spring 80. $P_m$ in annular space 64 urges valve spool 54 rightwardly to decrease the flow area giving rise to an increased $P_p$ which will in turn increase $P_b$ through the action of actuator 20. $P_b$ in annular space 79 acts on piston 72 urging the abutting spool 54 leftwardly to increase the flow area presented by slot 84 and thus reduce $P_p$ and $P_b$.

Assuming that the vehicle is travelling at a given speed above the threshold of low speed cutout valve 100, and the master cylinder 10 is fully actuated, $P_m$ will move valve spool 54 rightwardly so that the flow area of slot 84 substantially restricts the exhausting of $P_p$ to orifice 38. The resultant $P_p$ generated by pump 16 acts through modulator 20 to provide a $P_b$ of such magnitude that the wheel 14 may lock up. This $P_b$ acts leftwardly on spool 54 against the $P_m$ pressure force and urges spool 54 to increase the flow area presented by slot 84. Before the wheel locks up, it must slow down and pump 16 is slowed in synchronism. The $P_p$ will be decreased with wheel speed and actuator 20 will accordingly decrease $P_b$. In this manner the speed of wheel 14 is made to decrease in synchronism with the vehicle without locking up, but at a wheel slip ratio controlled by the operator.

When the wheel 14 has slowed to the predetermined low speed, the speed reference pressure in conduit 40 will have dropped below the threshold pressure of low speed cutout valve 100 so that spring 116 unseats tapered plunger 102. At this point, $P_m$ from master cylinder 10 is communicated through the low speed cutout valve directly to $P_b$ conduit 30 and the wheel brake 12. Thus braking effort is maintained even though the wheel 14 and the pump 16 are completely stopped.

The exponentially decreasing flow area portion A of slot 84 and the minimum area portion B of the slot 84 provide a decreasing sensitivity in the slip control valve 36. When the differential between master cylinder pressure $P_m$ and brake pressure $P_b$ is increased, the wheel slip also increases. The flow area presented by slot 84 decreases at an exponentially decreasing rate as the spool 54 moved rightwardly under the influence of the increasing differential between $P_m$ and $P_b$ so that the flow area becomes less and less sensitive to the differential as it increases. In this manner the operator may control the level of wheel slip but can never cause the wheel to lock-up altogether.

The variable sensitivity feature of slip control valve 36 may alternately be provided by a slot 84 having a flow area which decreases linearly followed by a portion having a constant minimum flow area. In this case, the spring 80 would be of variable rate so that the flow area would decrease at a decreasing rate when the spool 54 is moved rightwardly.

We claim:

1. In a vehicle having a wheel brake system including a fluid pressure operated wheel brake and an operator actuated master pressure generating device the combination of:

a positive displacement pump connected to the wheel for synchronous operation therewith;

actuator means providing a brake pressure to the wheel brake in proportion to the pump generated pressure;

orifice means exhausting the pump generated pressure so that the wheel brake is not normally actuated throughout the range of wheel speed;

slip control valve means interposed fluidly intermediate the pump and the orifice means and including a housing, a valve spool slidable from a normal position to progressively restrict fluid flow from the pump to the orifice means, linear rate spring means urging the valve spool to the normal position, means introducing master pressure into the housing to urge the spool from the normal position, and means introducing brake pressure into the housing to urge the spool toward the normal position to vary the magnitude of the flow restriction as a function of the difference between master pressure and brake pressure, the housing and valve spool being ported relative to one another to provide upon movement of the spool from the normal position a flow area decreasing exponentially to a constant minimum flow area so that the change in flow area becomes progressively less responsive to the increasing differential between master pressure and brake pressure;

and normally open valve means communicating master pressure to the wheel brake and including means responsive to a predetermined fluid pressure existing fluidly intermediate the slip control valve and the orifice means to close the normally open valve means.

* * * * *